United States Patent [19]
Miyazaki et al.

[11] Patent Number: 5,684,600
[45] Date of Patent: Nov. 4, 1997

[54] IMAGE PROCESSOR FOR SMOOTHING AND DIFFERENTIATING PERIODIC AREAS AND CHARACTER AREAS USING COEFFICIENTS

[75] Inventors: Tadashi Miyazaki; Masaya Fujimoto; Hidechika Kumamoto; Haruo Yamamoto; Shinji Hayashi, all of Osaka, Japan

[73] Assignee: Mita Industrial Co., Ltd., Osaka, Japan

[21] Appl. No.: 575,083

[22] Filed: Dec. 19, 1995

[30] Foreign Application Priority Data

Dec. 22, 1994 [JP] Japan ................................. 6-320256

[51] Int. Cl.[6] ............................. H04N 1/40; H04N 1/46; G06K 9/36
[52] U.S. Cl. ........................ 358/298; 358/448; 358/454; 358/462; 358/530; 358/533; 382/266
[58] Field of Search ............................ 358/298, 448, 358/454–456, 462, 265, 466, 530, 532, 533; 382/176, 190, 191, 254, 264, 266, 269, 271, 282

[56] References Cited

U.S. PATENT DOCUMENTS

| | | | |
|---|---|---|---|
| 5,029,227 | 7/1991 | Kawamura | 358/455 X |
| 5,134,667 | 7/1992 | Suzuki | 382/266 |
| 5,231,677 | 7/1993 | Mita et al. | 382/266 |

*Primary Examiner*—Eric Frahm
*Attorney, Agent, or Firm*—Beveridge, DeGrandi, Weilacher & Young, L.L.P.

[57] ABSTRACT

An image processor performs emphasis processings suitable for materials to be copied to produce clear copy outputs. The image processor has a digitizing circuit which outputs a digital signal produced by digitizing an image. The processor further has a first detecting circuit which detects an area of the digital signal including a periodic component, a second detecting circuit which detects a character area of the digital signal, and a smoothing circuit which smoothes the digital signal to output a smoothed signal. Either the digital signal or the smoothed signal is selected and outputted by a changeover circuit according to an output of the first detecting circuit. The output of the changeover circuit is differentiated into a plurality of differentiated signals by a differentiating circuit by use of a plurality of different coefficients. One of the differentiated signals is selected and outputted according to the outputs of the first and second detecting circuits.

4 Claims, 14 Drawing Sheets

Fig. 4A
CHRISTMAS EVE
Fig. 4B
Fig. 4C

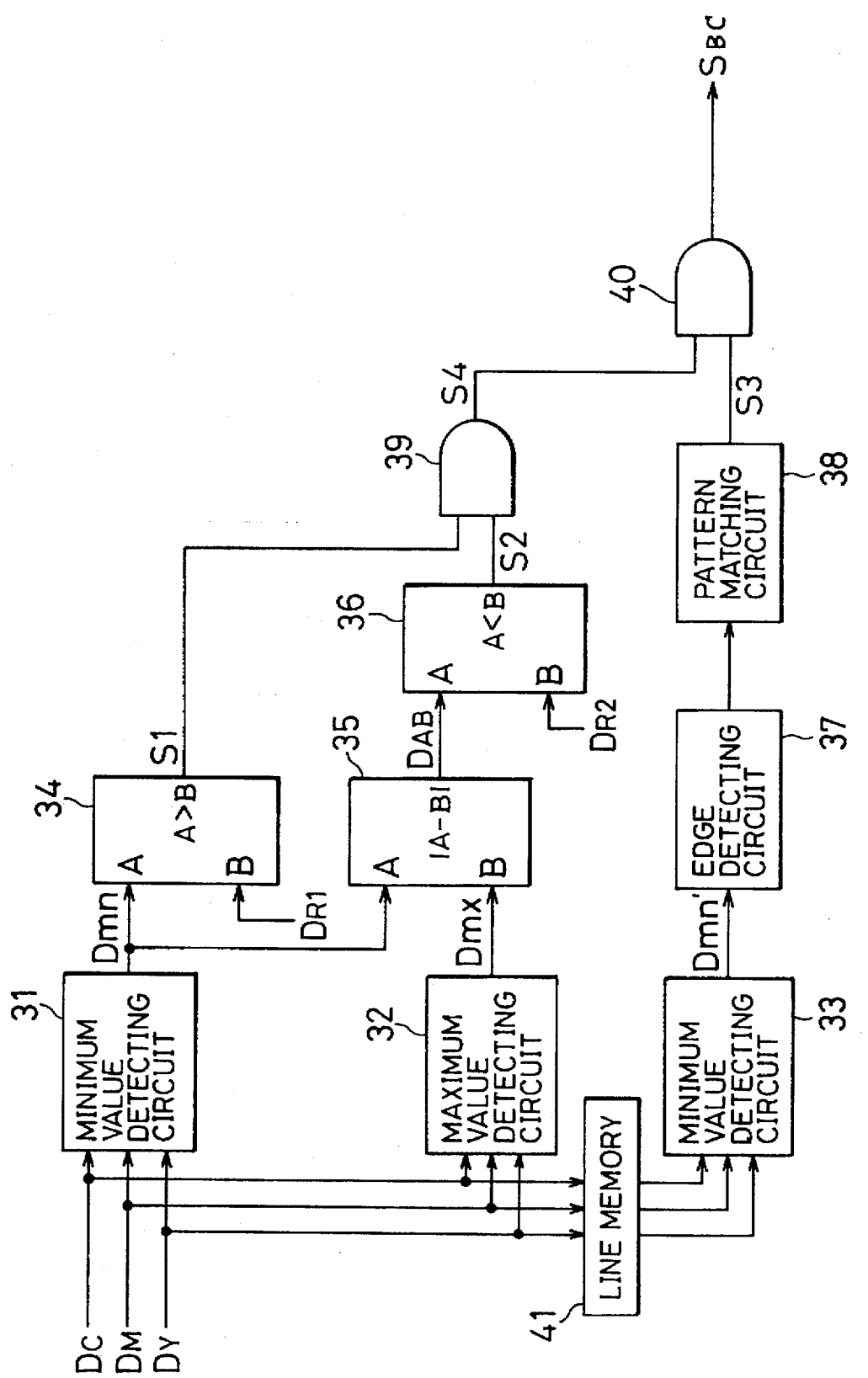

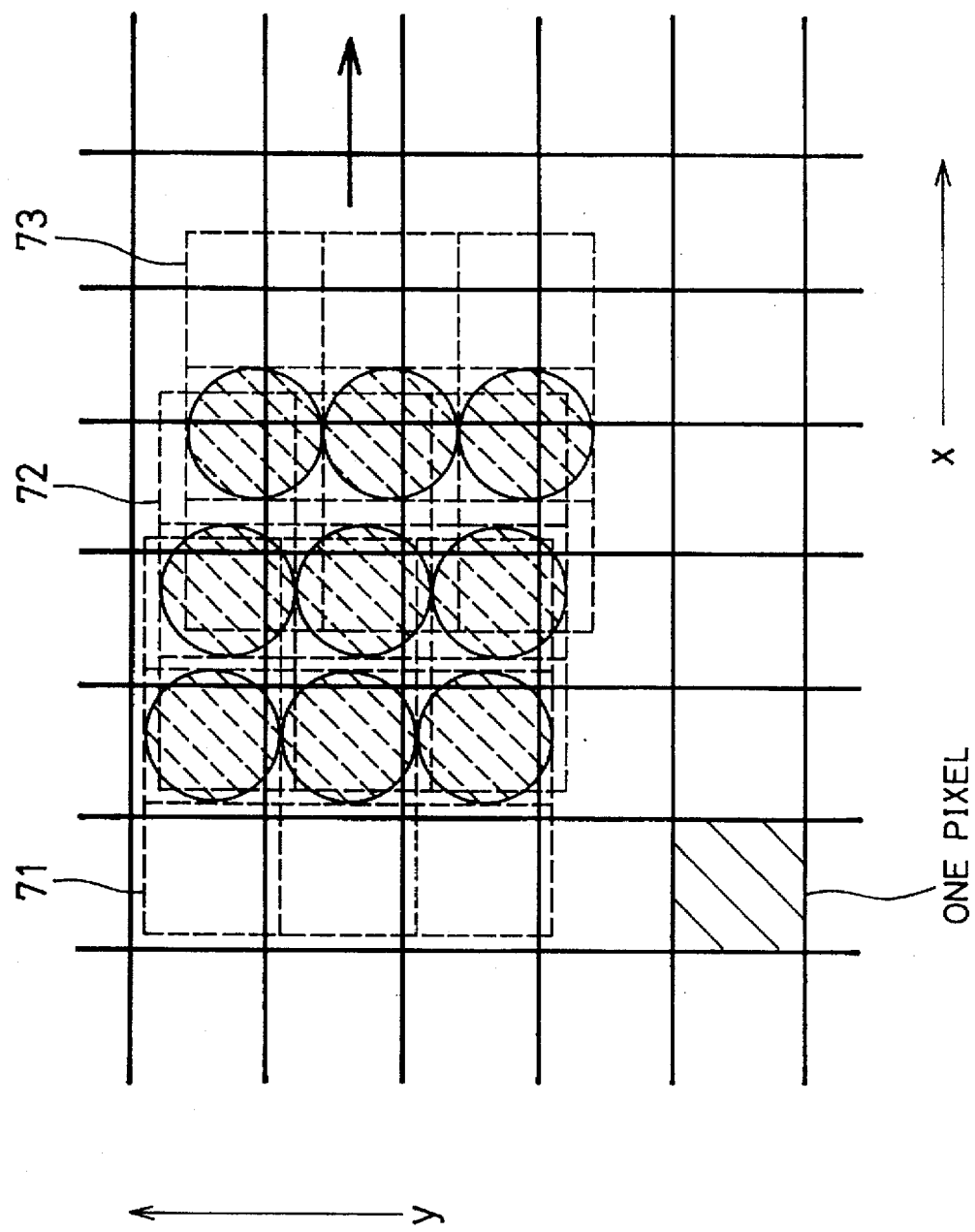

Fig.14A ×1/9

| 1 | 1 | 1 |
|---|---|---|
| 1 | 1 | 1 |
| 1 | 1 | 1 |

Fig.14B ×a

|   | -1 |   |
|---|----|---|
| -1 | 5 | -1 |
|   | -1 |   |

Fig.14C ×b

|   | -1 |   |
|---|----|---|
| -1 | -4 | -1 |
|   | -1 |   |

IMAGE PROCESSOR FOR SMOOTHING AND DIFFERENTIATING PERIODIC AREAS AND CHARACTER AREAS USING COEFFICIENTS

BACKGROUND OF THE INVENTION

1. Field of the Invention

The present invention relates to an image processor suitable for use in a system such as a video printer, a copying machine, particularly, a color copying machine which colorprints color images.

2. Description of the Prior Art

In recent years, the image processor has been steadily developing from a black-and-white image processor into a color image processor. In color printing, images are separated into the three primary colors and captured by the processor to undergo various processings, so that color images are printed on paper. For these processings, various spatial filtering and pattern recognizing techniques are used. These techniques produce various applications, including color copying machines, such as the printing of color video signals for the NTSC and HDTV systems, pictures and CAD (computer aided-design) data.

For example, 1994-model word processors having functions to prepare new year cards which have been on the market include the following: a word processor in which composite video signals are captured from video tape recorders; a word processor in which a camera is attached to input images; and a word processor in which photos are read in by a scanner attached to the printer. Thus, the range of use of color printing has been steadily and rapidly increasing.

As a typical image processor for color printing, an image processor for use in a color copying machine will be described with a prior art as an example. FIG. 1 is a schematic block diagram showing the arrangement of a conventional image processor for use in a color copying machine. In the figure, the image of an original 1 optically read in by a scanner 2 is converted into analog electric signals corresponding to the three primary colors, i.e. red (R), green (G) and blue (B), analog-to-digital (A/D) converted in 8 bits (256 tones) while being sampled by an A/D converter (not shown) incorporated in the scanner 2, and inputted in series to a complementary color reversing circuit 3 and a character edge determining circuit 12 as numeric (digital) data $D_R$, $D_G$ and $D_B$ corresponding to the sampling points.

At the complementary color reversing circuit 3, the numeric data $D_R$, $D_G$ and $D_B$ are processed to obtain complementary colors for printing, and complementary color data $D_C$, $D_M$ and $D_Y$ corresponding to cyan (C), magenta (M) and yellow (Y) are outputted. The complementary color data $D_C$, $D_M$ and $D_Y$ are transmitted to the character edge processing circuit 13.

In the character edge determining circuit 12, as shown in FIG. 2, the numeric data $D_R$, $D_G$ and $D_B$ are transmitted to a pixel color determining circuit 12a and only the numeric data $D_G$ is transmitted to an edge determining circuit 12b. At the pixel color determining circuit 12a, a signal $S_B$ whose logic becomes 1 when the color is black is outputted to determine a color which appears to be black. At the edge determining circuit 12b, a signal $S_C$ whose logic becomes 1 when a character edge is present is outputted to determine areas consisting only of characters and other areas. The logical product of the signals $S_B$ and $S_C$ is obtained by an AND circuit 13c and outputted as a signal Se. Thereby, only characters which appear to be black are detected.

The signal Se is transmitted to the character edge processing circuit 13 and only portions including characters are filtered to emphasize the edge. The complementary color data $D_C$, $D_M$ and $D_Y$ which have been filtered are converted into emphasized complementary color data $D_{C1}$, $D_{M1}$ and $D_{Y1}$ and transmitted to a black generating circuit 5. At the black generating circuit 5, black portions are detected to produce black data $D_{BK}$. Although black can be generated by uniformly synthesizing the three colors in principle, the black is dappled and indistinct in actuality. The generation of black is performed in order to avoid this problem.

The emphasized complementary color data $D_{C1}$, $D_{M1}$ and $D_{Y1}$ are corrected by a tone correcting circuit 6 and are converted into corrected complementary color data $D_{C2}$, $D_{M2}$ and $D_{Y2}$, which are transmitted to a half tone processing circuit 7. At the half tone processing circuit 7, the complementary color data $D_{C2}$, $D_{M2}$ and $D_{Y2}$ are processed so that half tones become distinct, and are transmitted to a printer 8 as output complementary color data $D_{C3}$, $D_{M3}$ and $D_{Y3}$. The black data $D_{BK}$ is merely relayed at the tone correcting circuit 6 and at the half tone processing circuit 7.

At the printer 8, color toner is attached and fixed onto the paper according to the output complementary color data $D_{C3}$, $D_{M3}$ and $D_{Y3}$ and the black data $D_{BK}$ to output a copy output 9 from the color copying machine (e.g. Japanese Laid-open Patent Application No. H3-88571).

However, the above-described conventional image processor for use in a color copying machine presents the following problems: First, in the above-described processing, the character edge processing circuit 13 does not perform the character emphasis for an original 1 including, for example, net-pattern areas even though character areas are included. Second, if such net-pattern areas (FIGS. 4A and 4C) are edge-emphasized by the character edge processing circuit 13, moire (color stripes) is caused. This problem causes the following problem to the users:

For example, recently, word processors are capable of handling color image inputs as described above, and in business documents prepared on such word processors, portions to be emphasized are frequently superimposed with the net-pattern. Such business documents may include the following four areas: an area including only characters (FIG. 4A); an area including only a net-pattern (FIG. 4B); an area including both characters and a net-pattern (FIG. 4C); and other areas. Therefore, if the area including only characters (FIG. 4A) is edge-emphasized or if the net-pattern area is edge-emphasized like the character area, in the copy output 9, the portion (FIG. 4C) that the person who prepared the document wishes to emphasize is indistinct and illegible because of blur and moire.

Thirdly, since the pixel color determining circuit 12a determines black from the three primary colors, i.e. red, green and blue, black which is represented by the numeric data being all 0 is difficult to determine according to noises and background colors, so that it is impossible to consummately find black.

Such problems are typical not only of color copy outputs of color copying machines but also of color print outputs of video printers and CAD systems.

SUMMARY OF THE INVENTION

An object of the present invention is to provide an image processor which performs emphasis processings suitable for materials to be copied to produce clear copy outputs.

An image processor of the present invention is provided with: digitizing means for outputting a digital signal produced by digitizing an image; first detecting means for detecting an area of the digital signal including a periodic component; second detecting means for detecting a character area of the digital signal; smoothing means for smoothing the digital signal to output a smoothed signal; changeover means for outputting either the digital signal or the smoothed signal according to an output of the first detecting means; differentiating means for substantially differentiating an output of the changeover means by use of a plurality of different coefficients to obtain a plurality of differentiated signals; and selecting means for selecting one of the plurality of differentiated signals according to outputs of the first and second detecting means.

According to such features, an area including a periodic component of a digital signal representative of a digitized image outputted by the digitizing means is detected by the first detecting means, a character area is detected by the second detecting means, a changeover between a smoothed signal produced by smoothing the digital signal by the smoothing means and the digital signal is made by the changeover means, an output of the changeover means is differentiated by the differentiating means by use of a plurality of different coefficients, and one of a plurality of outputs of the differentiating means is selected by the selecting means according to outputs of the first and second detecting means. As a result, an emphasizing processing suitable for the material to be copied can be performed to produce a clear color copy output.

BRIEF DESCRIPTION OF THE DRAWINGS

This and other objects and features of this invention will become clear from the following description, taken in conjunction with the preferred embodiments with reference to the accompanied drawings in which:

FIGS. 4A to 4C show examples of images to be processed in the embodiment;

FIG. 5 is a block diagram showing the arrangement of a black character area determining circuit of the embodiment;

FIG. 9 shows an operation principle of the pattern matching circuit provided in the black character area determining circuit of the embodiment;

FIGS. 14A to 14C show the arrangement of coefficients of a smoothing filter and an edge emphasizing filter provided in the by-area adaptive processing circuit of the embodiment.

DESCRIPTION OF THE PREFERRED EMBODIMENTS

Figure 1:
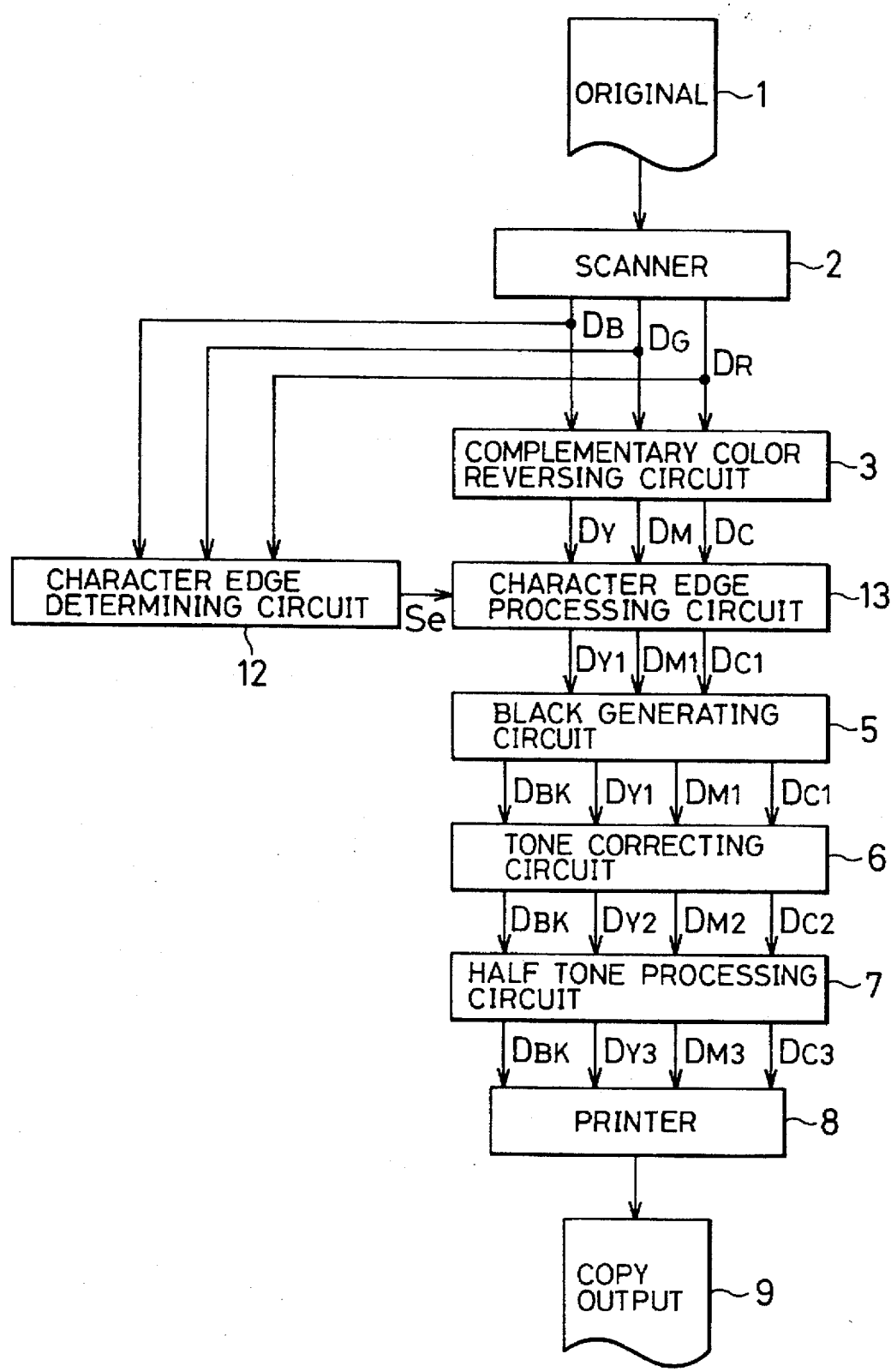
FIG. 1 is a schematic block diagram showing the arrangement of a color copying machine employing a conventional image processor.
Figure 2:
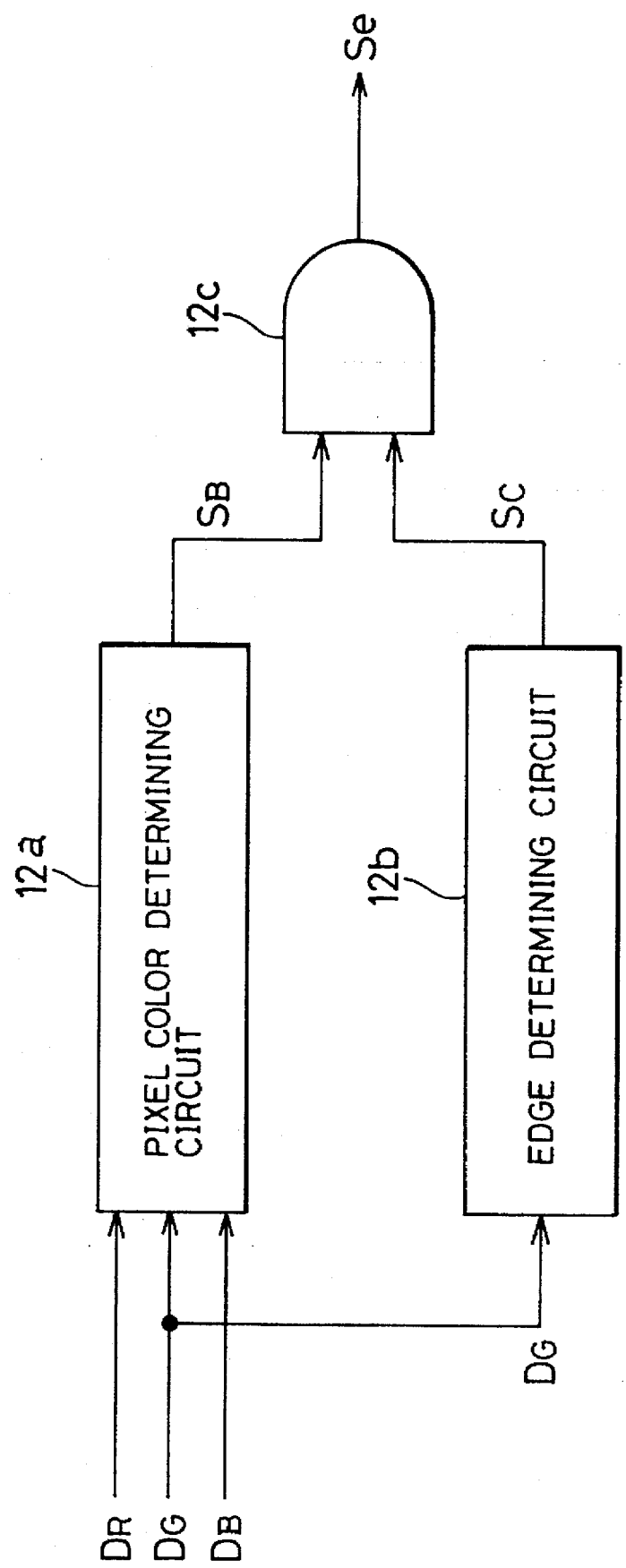
FIG. 2 is a block diagram showing the arrangement of a character edge determining circuit of the conventional image processor.
Figure 3:
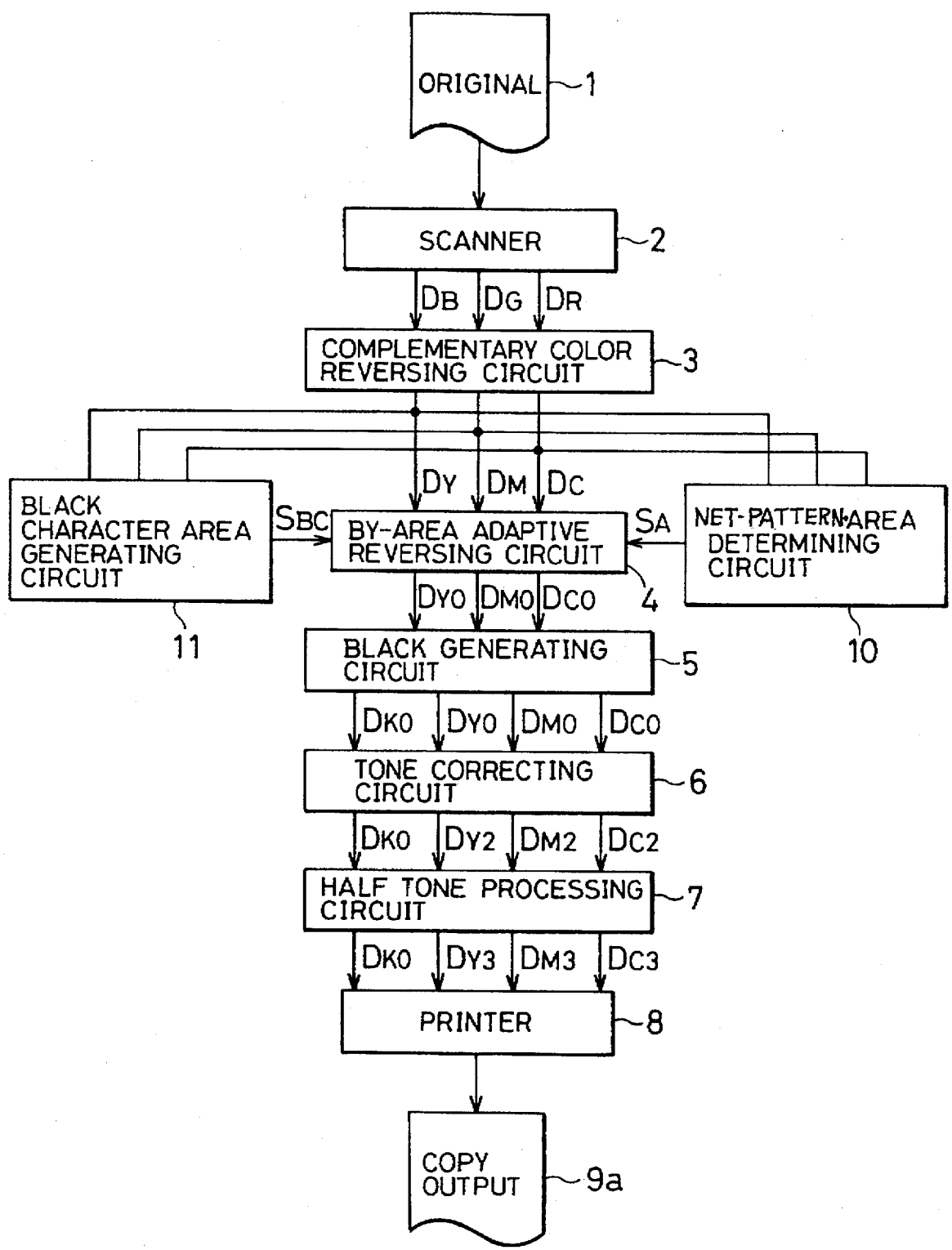
FIG. 3 is a schematic block diagram showing the arrangement of a color copying machine employing an image processor embodying the present invention.

Hereinafter, an image processor of the present invention will be described with reference to the drawings. FIG. 3 is a schematic block diagram showing the hardware arrangement of an image processor embodying the present invention employed in a color copying machine. In the figure, an original 1, a scanner 2, a complementary color reversing circuit 3, a black generating circuit 5, a tone correcting circuit 6, a half tone processing circuit 7 and a printer 8 are the same as those of the conventional image processor and will not be described. The present invention is characterized in that a by-area adaptive processing circuit 4, and a net-pattern area determining circuit 10 and a black character area determining circuit 11 which control the circuit 4 are provided.

An operation of the image processor thus arranged will hereinafter be described. First, the arrangement of the black character area determining circuit 11 will be described with reference to the block diagram of FIG. 5. In the figure, reference numerals 34 and 36 represent digital comparators, reference numeral 35 represents a digital arithmetic circuit, and reference numerals 39 and 40 represent AND circuits.

The complementary color data $D_C$, $D_M$ and $D_Y$ are transmitted to minimum value detecting circuits 31 and 33 and a maximum value detecting circuit 32 to obtain a minimum value Dmn and a maximum value Dmx at their sampling points. The minimum value Dmn outputted by the minimum value detecting circuit 31 is compared with a high reference value $D_{R1}$ (e.g. 200) by the digital comparator 34. When it is higher than the reference value $D_{R1}$, a signal S1 whose logic is "1" is outputted.

Moreover, with respect to the minimum value Dmn and the maximum value Dmx, the digital arithmetic circuit 35 performs the following calculation:

$$D_{AB} = |Dmn - Dmx| \quad (1)$$

The resulting output $D_{AB}$ is inputted to the digital comparator 36 and compared with a low reference value $D_{R2}$ (e.g. "10"). When it is lower than the reference value $D_{R2}$, a signal S2 whose logic is "1" is outputted.

Here, these processings mean the following: In the digital comparator 34, the reference value $D_{R1}$ is a reference value of printing density, and the logic of the output S1 is "1" when the inputted minimum value Dmn is of a high density and it is "0" when Dmn is of a low density. On the other hand, in the digital comparator 36, the reference value $D_{R2}$ is a reference value of a determination as to whether the color is chromatic or achromatic, and the logic of the output S2 is "1" in the case of an achromatic color and "0" in the case of a chromatic color.

With respect to black, it is generally known that a relationship $$D_C = D_M = D_Y \quad (2)$$

holds. Therefore, the color is determined to be achromatic if the maximum values and the minimum values of the complementary color data $D_C$, $D_M$ and $D_Y$ representative of numeric values corresponding to the densities of cyan, magenta and yellow which are complementary colors are substantially the same. Thereby, the logic of an output S4 of the AND circuit 39 is "1" in the case of high density and achromatic color, i.e. in the case of black.

Figure 6:
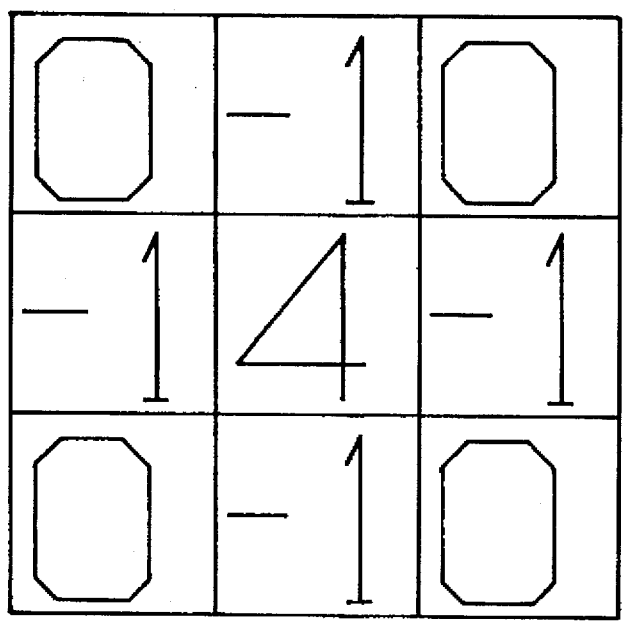
FIG. 6 is a view showing the arrangement of a filter of an edge detecting circuit provided in the black character area determining circuit of the embodiment.

The minimum value of the output of a line memory 41 is obtained by the minimum value detecting circuit 33 and outputted as minimum value data Dmn'. The data Dmn' is transmitted to the edge detecting circuit 37 and formed into an edge-emphasized image through a spatial differential filtering. This is a preprocessing for feature extraction and is also for correcting unsharpness of the original image. For example, a similar image processing is performed in animals' eyes and brains. As the differential filter, a known filter called Laplacian as shown in FIG. 6 may be used.

The image thus differentiated is converted by a pattern matching circuit 38 into a signal S3 whose logic becomes "1" in the case of character edge and becomes "0" in the case of nonedge.

Figure 7A:
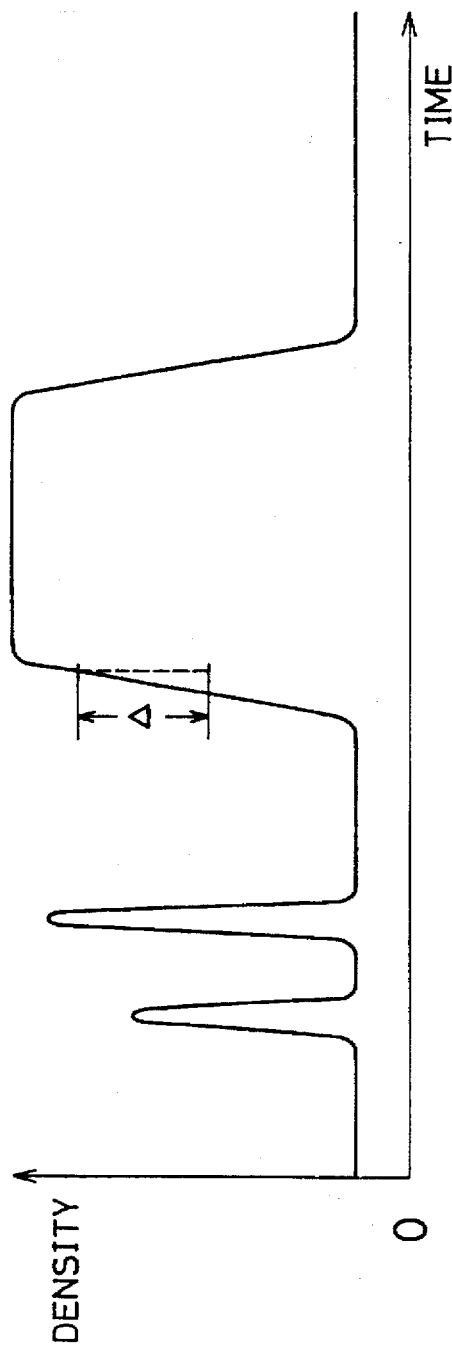
FIGS. 7A and 7B are waveform charts showing variations in density of a black character area of the embodiment.
Figure 7B:
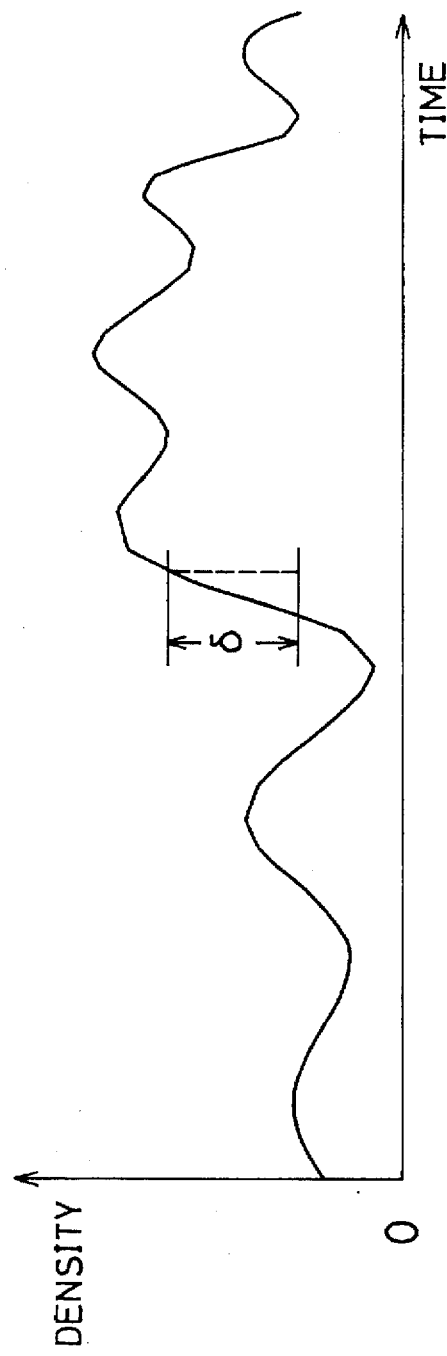
Figure 8A:
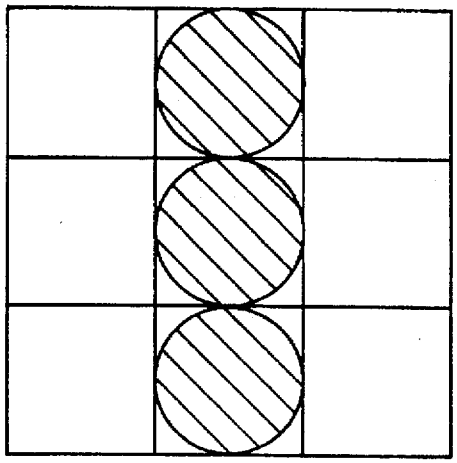
FIGS. 8A to 8D show matching patterns used by a pattern matching circuit provided in the black character area determining circuit of the embodiment.
Figure 8B:
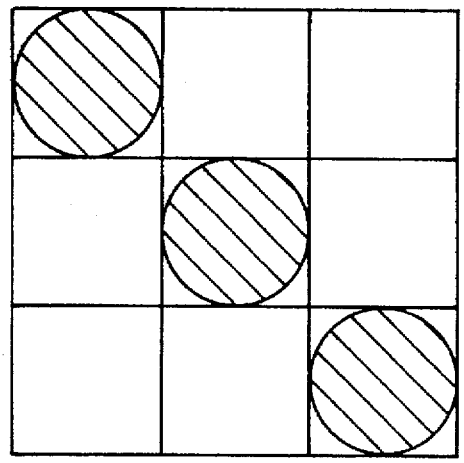
Figure 8C:
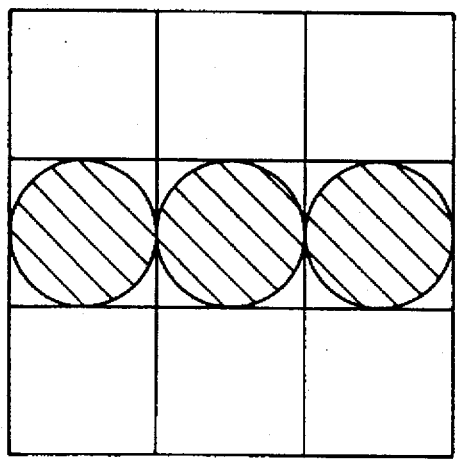
Figure 8D:
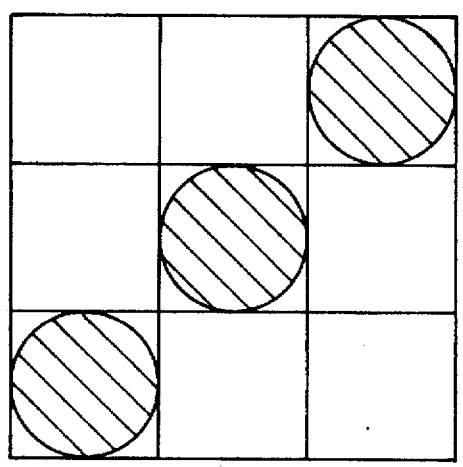

FIG. 7A is a waveform chart showing a variation in amplitude (i.e. variation in density) of the minimum value Dmn' when a character area is read in. FIG. 7B is a waveform chart showing a variation in amplitude of the minimum value Dmn' when an area other than a character area (e.g. picture area) is read in. As is apparent from FIGS. 7A and 7B, a with-time inclination $\Delta$ of the density variation in FIG. 7A and a with-time inclination 6 of the density variation in FIG. 7B are largely different from each other. By differentiating them, the edge is further emphasized.

To do so, for example, whether or not the input signal matches the four patterns in 3×3 plane surfaces as shown in FIG. 8A to 8D is determined. FIG. 9 shows such a pattern matching operation. In the figure, each lattice represents one pixel and FIGS. 71 to 73 shown by dotted lines represent positions of the pattern of FIG. 8A at each time. As shown by the arrow, whether the patterns match the input signal or not is determined while shifting the pattern pixel by pixel in the direction of x-axis (lateral direction on the plane of the figure). When the patterns match, the signal whose logic is "1" is outputted. The input signal may be shifted pixel by pixel instead of the pattern.

Such an operation is successively performed for the entire surface of the original 1 read in by the scanner 2 and a similar processing is repeated for all the patterns shown in FIGS. 8A to 8D. In FIG. 9, the patterns 71 to 73 are shown being slightly shifted from one another for easy discrimination.

With respect to the signal S3 representative of a character edge detected at the pattern matching circuit 38 through the above-described process, a logical product with the output S4 of the AND circuit 39 is obtained at the AND circuit 40 and a black character signal $S_{BC}$ is outputted whose logic becomes "1" only at black character portions. Not only the pattern matching but also a so-called pattern recognizing technique may be used in which vectors or symbol strings are formed from an image to obtain a correlation between the vectors or the symbol strings.

Figure 10:
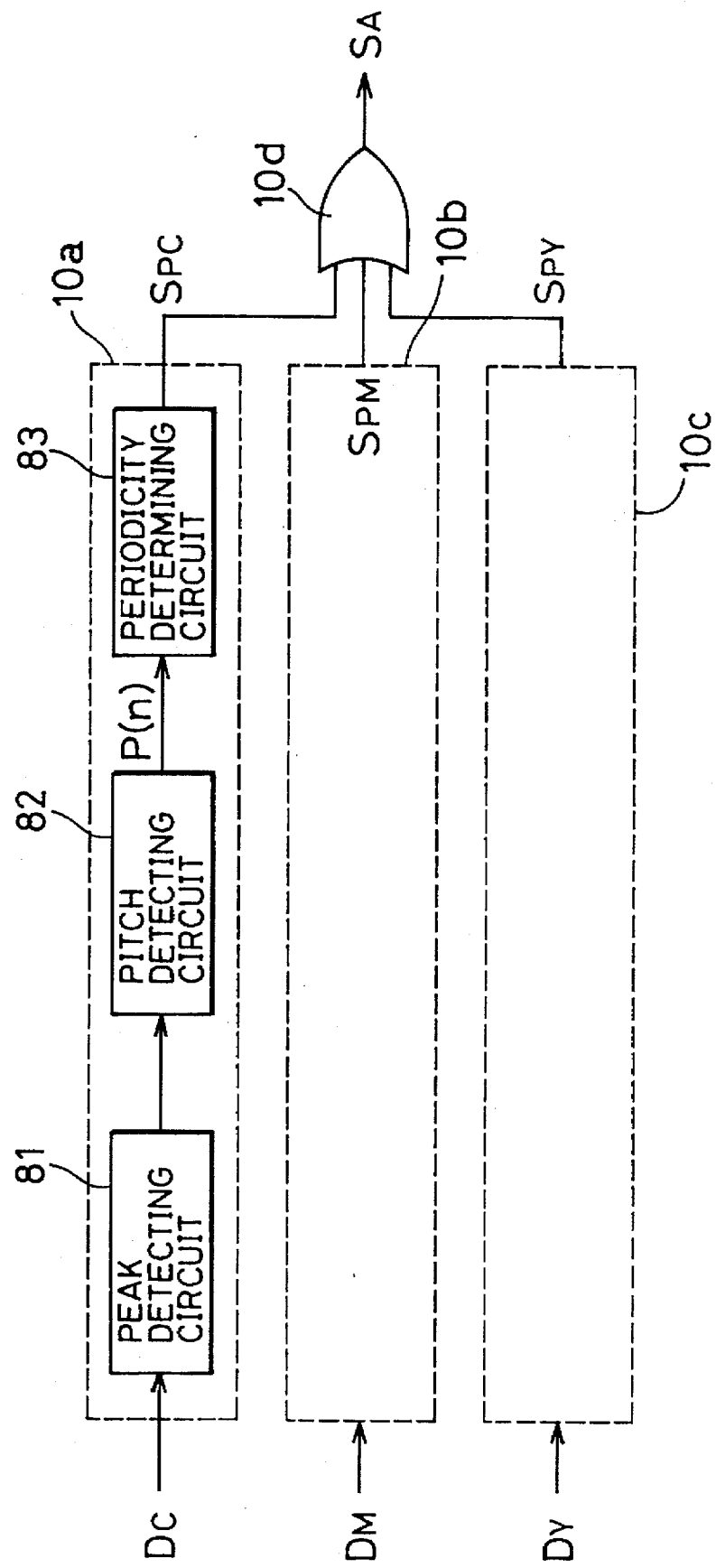
FIG. 10 shows a block diagram showing the arrangement of a net-pattern area determining circuit of the embodiment.

Subsequently, the arrangement of the net-pattern area determining circuit 10 and its operation will be described. FIG. 10 is a schematic block diagram of the arrangement of the net-pattern area determining circuit 10 of this embodiment. In the figure, 10a to 10c represent principal portions of the net-pattern area determining circuit 10, and 10d represents an OR circuit. An operation of the net-pattern area determining circuit 10 thus arranged will be described.

The blocks 10a to 10c each include a peak detecting circuit 81, a pitch detecting circuit 82 and a periodicity determining circuit 83, and the complementary color data $D_C$, $D_M$ and $D_Y$ are inputted thereto. With respect to the outputs of the blocks 10a to 10c, the logical sum is executed with the OR circuit 10d and a net pattern signal $S_A$ is outputted. Hereinafter, an operation of the block 10a will be described as a representative of operations of the blocks 10a to 10c.

Figure 11A:
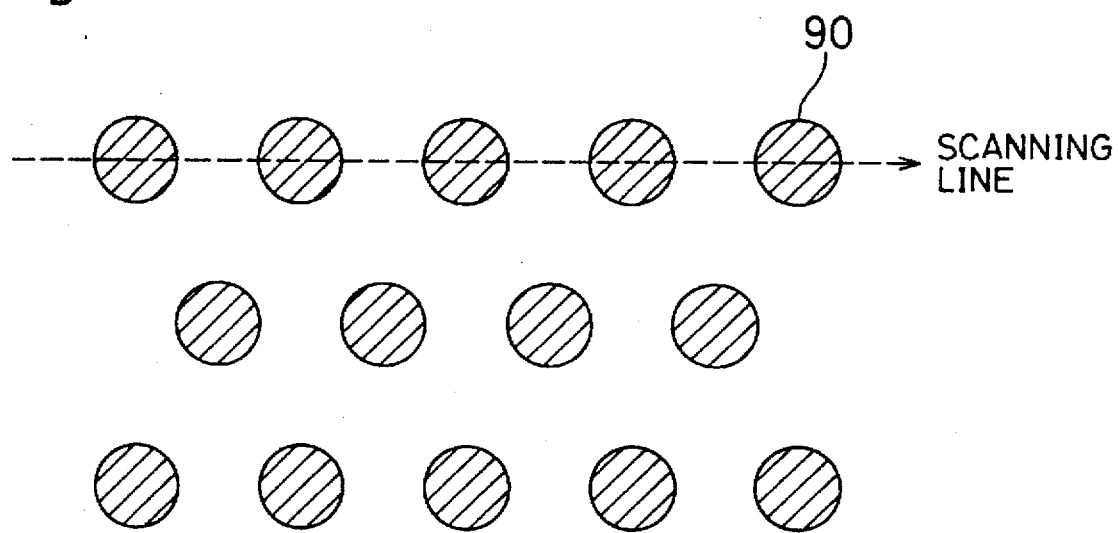
FIGS. 11A and 11B show an example of a net-pattern area and a waveform chart showing a variation in density thereof in the embodiment.
Figure 11B:
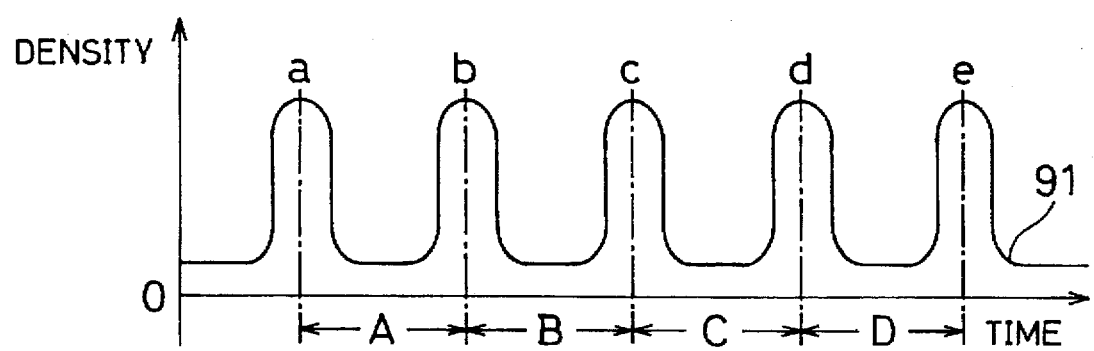
Figure 12:
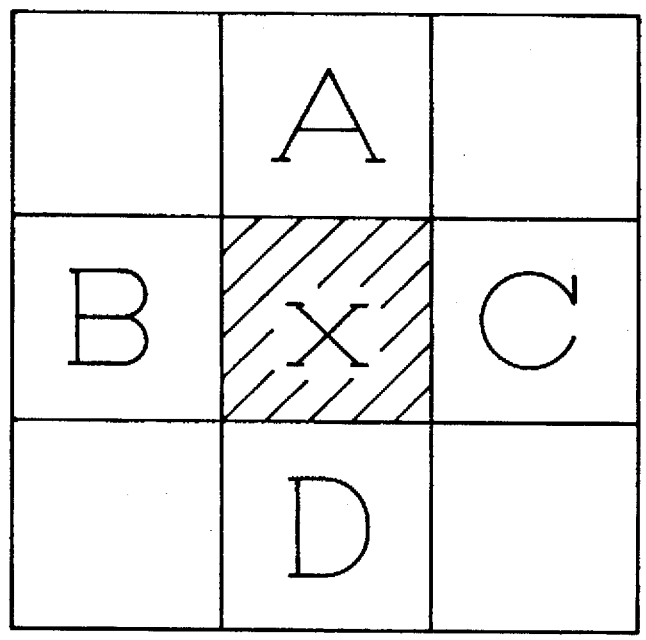
FIG. 12 is an explanatory view showing an operation principle of a peak detecting circuit provided in the net-pattern area determining circuit of the embodiment.

Receiving the complementary color data $D_C$, the peak detecting circuit 81 detects the peak of a variation in amplitude (i.e. density) of the complementary color data $D_C$. In the net-pattern area, for example, dots 90 are substantially equally spaced as shown in FIG. 11A. If the dots 90 are scanned as shown by the broken line of FIG. 11A, the density of the original read-in shows a with-time variation as shown in FIG. 11B. In FIG. 11B, points a to e at which the longitudinal dash and dotted lines and the waveform 91 intersect are the peaks. To detect such peaks, it is detected that the value at an arbitrary point x is greater than the upper, lower, left and right values A, B, C and D as shown in FIG. 12.

Peak intervals A to D of the waveform 91 is measured as a numeric value P(n) at the pitch detecting circuit 82. Here, n is a finite natural number. For the measurement, for example, a high-frequency clock is used to count the number of clock pulses counted during the time periods between the peaks a and b, b and c, c and d, and d and e.

The numeric value P(n) is compared at the periodicity determining circuit 83 every time, and a signal $S_{PC}$ whose logic becomes "1" when it is determined a predetermined times that $$|P(n)-P(n+1)| \leq P_D \qquad (3)$$

Here, $P_D$ is a finite natural number. Such a processing is similarly performed for the blocks 10b and 10c to output signals $S_{PM}$ and $S_{PY}$, respectively, and the net-pattern signal $S_A$ is outputted as described above.

Figure 13:
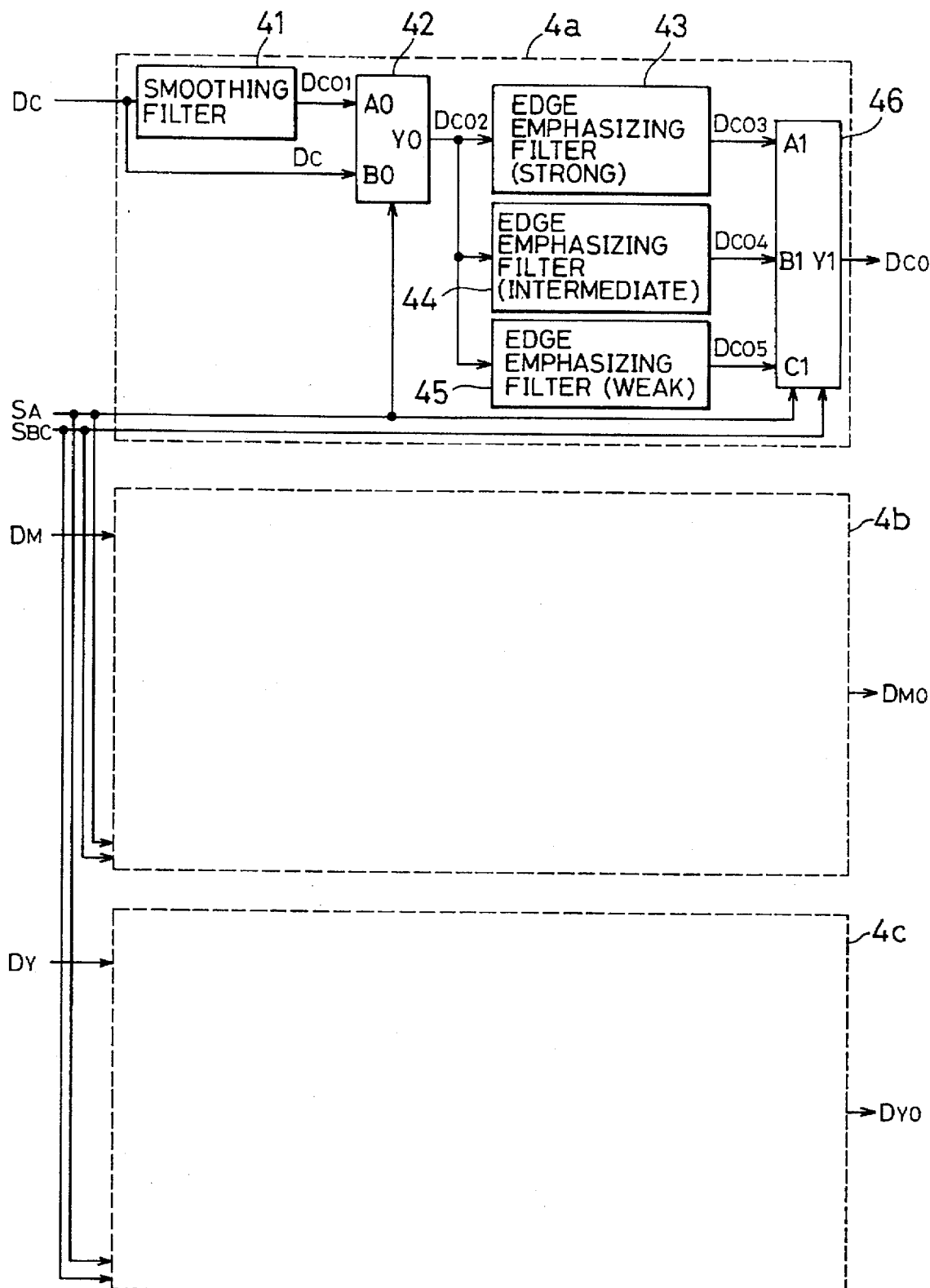
FIG. 13 is a block diagram showing the arrangement of a by-area adaptive processing circuit of the embodiment.

The net-pattern signal $S_A$ thus detected and the black character signal $S_{BC}$ are used in the by-area adaptive processing circuit 4 in the following manner: FIG. 13 is a schematic block diagram showing the arrangement of the bi-area adaptive processing circuit 4. In the figure, 4a to 4c represent processing blocks which adaptively filter the input complementary color data $D_C$, $D_M$ and $D_Y$ to convert them into emphasized complementary color data $D_{CO}$, $D_{MO}$ and $D_{YO}$. Reference numerals 42 and 46 represent selectors.

With respect to the by-area adaptive processing circuit 4 thus arranged, the processing block 4a to which the cyan complementary color data $D_C$ is inputted will be described as a representative of the other processing blocks 4b and 4c. The processing blocks 4b and 4c have completely the same arrangement as the processing block 4a and are technically equivalent thereto.

Figures 14A, 14B, 14C:
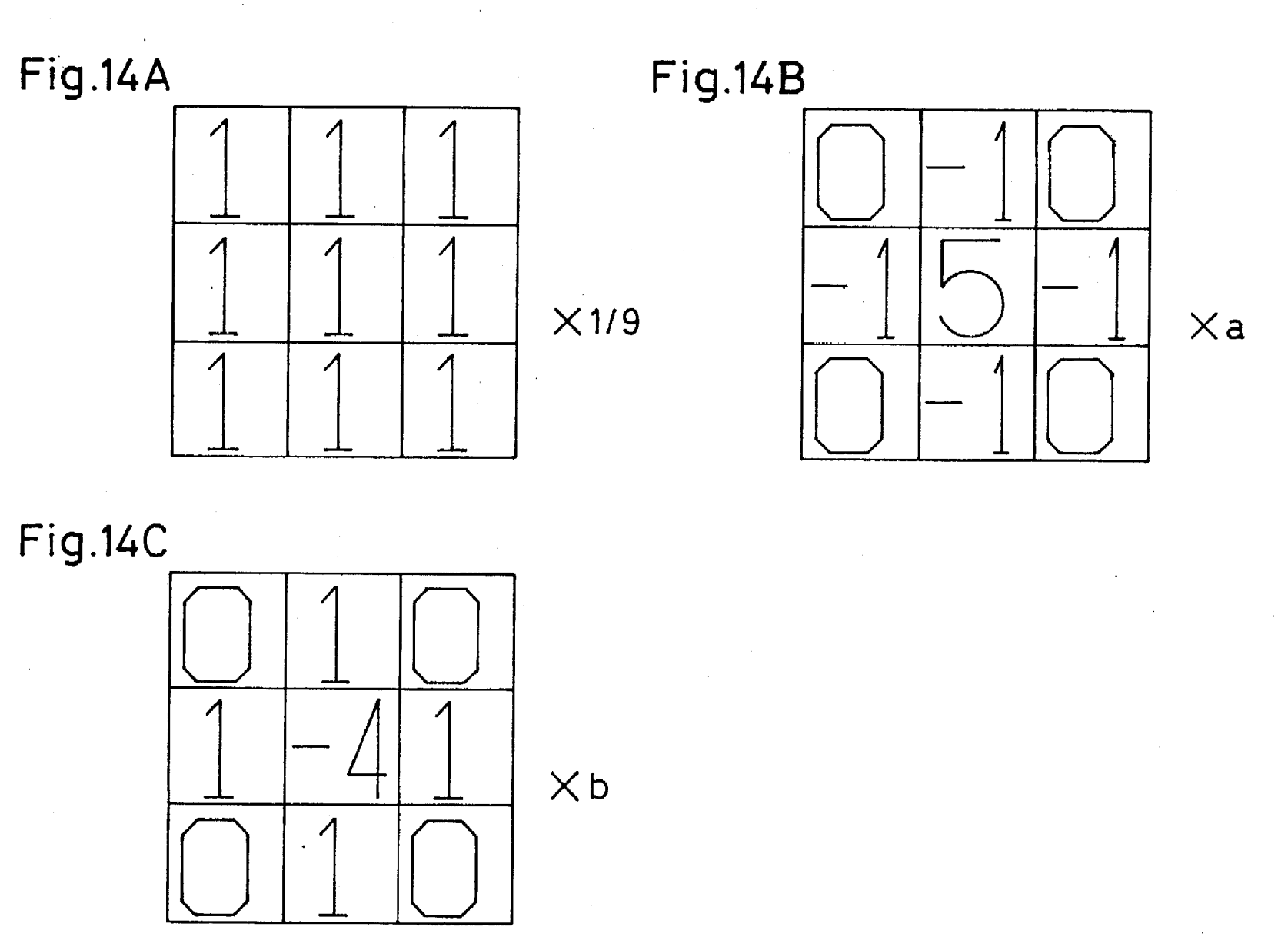

The complementary color data $D_C$ is inputted to a smoothing filter 41 and a B0 terminal of the selector 42. At the smoothing filter 41, a spatial filter as shown in FIG. 14A is used. The calculation of the spatial filter is given by the following expression (4):

$$p^s_{i,j} = \sum_{l=-1}^{1} \sum_{m=-1}^{1} h_{l,m} \cdot S_{i-l, j-m} \qquad (4)$$

where $p^s_{i,j}$ is the value of an output $D_{CO1}$ of the smoothing filter 41, $S_{i,j}$ is the value of the input $D_C$ to the smoothing filter 41, and $h_{l,m}$ is the coefficient of the smoothing filter 41 which takes a value within the frame in FIG. 14A.

As is apparent from the expression (4), the smoothing filter 41 averages the values in the vicinity of the processing point. A characteristic $H(\mu,v)$ in its spatial frequency range is obtained by Fourier-converting the expression (4) and given by the following expression (5):

$$H(\mu,v) = \frac{1}{9} \cdot [1 + 2\cos 2\pi\mu][1 + 2\cos 2\pi v] \qquad (5)$$

where $\mu$ and $v$ are parameters representative of spatial frequency axes.

The complementary color data $D_{CO1}$ thus smoothed through averaging is inputted to an A0 terminal of the selector 42. When the logic of the net-pattern signal $S_A$ is "1", the output $D_{CO1}$ of the smoothing filter 41 is outputted to an output Y0. When the logic is "0", the complementary color data $D_C$ is outputted to the output Y0.

An output $D_{CO2}$ of the selector 42 is outputted to each of an edge emphasizing filter 43 for strong edge emphasis, an edge emphasizing filter 44 for intermediate edge emphasis and an edge emphasizing filter 45 for weak edge emphasis. The edge emphasizing filters 43 to 45 have a structure as shown in FIG. 14B. Such filters are called quadratic differentiation filters or Laplacian and given by the following expressions (6):

$$p^L{}_{i,j} = a \cdot [5s_{i,j} - (s_{i+1,j} + s_{i-1,j} + s_{i,j+1} + s_{i,j-1})] \qquad (6)$$

where $p^L{}_{i,j}$ is the values of outputs $D_{CO3}$ to $D_{CO5}$ of the edge emphasizing filters 43 to 45, $s_{i,j}$ is the value of the input $D_{CO2}$ to the edge emphasizing filters 43 to 45, and a is the coefficient which differs among the edge emphasizing filters 43 to 45.

A characteristic $H'(\mu,v)$ in the spatial frequency ranges of the edge emphasizing filters 43 to 45 is obtained by Fourier conversion like the condition (5) and given by the following expression (7):

$$H'(\mu,v) = a \cdot [5 - 2\cos 2\pi\mu - 2\cos 2\pi v] \qquad (7)$$

Thus, the edge emphasizing filters 43 to 45 are typical high frequency filter.

The coefficients a for the edge emphasizing filters 43 to 45 are obtained, for example, as shown in Table 1.

By providing such different coefficients a to the differentiation filters, the output amplitudes of the edge area differ among the outputs $D_{CO3}$ to $D_{CO5}$ of the edge emphasizing filters 43 to 45, so that the filters 43 to 45 have different emphasizing effects. The filter coefficients may be as shown in FIG. 14C. Further, the sizes of the edge emphasizing filters are not limited to 3×3; the filters may be filters having a typical differentiating effect. This applied to the smoothing filter 41.

The outputs $D_{CO3}$ to $D_{CO5}$ are transmitted to the selector 46, and the emphasized complementary color data $D_{CO}$ to be outputted is selected from a terminal Y1 by the net-pattern signal $S_A$ and the black character signal $S_{BC}$ and outputted. The selection is made by a process as shown in Table 2.

By the above-described operations of the selectors 42 and 46, the output of the bi-area adaptive processing circuit 4 results as follows:

The output $D_{CO}$ of the bi-area adaptive processing circuit 4 is transmitted together with the other outputs $D_{MO}$ and $D_{YO}$ by way of the black generating circuit 5, the tone correcting circuit 6 and the half tone processing circuit 7 to the printer 8, so that a copy output 9 where the black characters and the net-pattern areas are also clear is printed out.

As described above, according to the present invention, by performing at the by-area adaptive processing circuit 4 edge emphasis different in three stages corresponding to the six different areas shown in Table 3, the character reproducibility improves for black characters with no net-pattern (FIG. 4A) and the restriction of moire generation and the improvement of character reproducibility are both achieved for black characters with a net-pattern (FIG. 4C). Likewise, the reproducibility improves for half tone areas. In an area where there is only a net-pattern (FIG. 4B), by passing the data through the smoothing filter 41, a processing in view of the restriction of moire generation can also be performed.

While a color copying machine is described in this embodiment, the present invention is employable, with completely the same arrangement, for word processors handling image inputs. With respect to video printers, the scanner 2 is replaced by a circuit which converts a composite or a YC-separated video signal into R, G and B signals, and the present invention is employable for the processing at and behind the complementary color reversing circuit 3. Moreover, the present invention is readily employed for printing compressed digital image data inputs from video compact disks, digital video disks, digital video tape recorders and the like.

While this embodiment premises color printing, in the case of monochrome images, the R, G and B signals and the C, M and Y signals are replaced by a single signal merely representing a shade. In this case, the black generating circuit 5 is unnecessary and the processings for the three complementary colors are abridged into a single processing. The present invention is practicable and modifiable in various manners within the scope of the invention.

As described above, according to the present invention, an area including a periodic component of a digital signal representative of a digitized image outputted by the digitizer is detected by the first detector, a character area is detected by the second detector, a changeover between a smoothed signal produced by smoothing the digital signal by the smoothing circuit and the digital signal is made by the changeover circuit, an output of the changeover circuit is differentiated by the differentiating circuit by use of a plurality of different coefficients, and one of a plurality of outputs of the differentiating circuit is selected by the selector according to outputs of the first and second detector. As a result, an emphasizing processing suitable for the material to be copied is performed to produce a clear color copy output.

Moreover, by performing an edge emphasis which differs for each of a plurality of stages corresponding to different kinds of areas by the differentiating circuit, for example, the character reproducibility improves for black characters with no net-pattern, and the restriction of moire generation and the improvement of character reproducibility are achieved for black characters with a net-pattern. Moreover, the reproducibility similarly improves, for example, for half tone areas. Moreover, in an area where there is only a net-pattern, by passing the data through the smoothing circuit, a processing in view of the restriction of moire generation can also be performed. As a result, since the portions of the copy text to be emphasized are clearly copied, the convenience increases.

At the first detector, the spatially differentiating circuit substantially spatially differentiates the digital signal, the counter counts the period of an output of the spatially differentiating circuit, the determining circuit determines that an output of the counter is substantially constant, so that an area such as a net-pattern area included in an image is easily detected. As a result, processings such as edge emphasis and smoothing suitable for the area can be performed.

At the second detector, the density detector detects that the density of the digital signal is greater than a predetermined density, the color detector detects that the digital signal has been colored, the pattern detector detects that the digital signal matches a predetermined pattern. When the digital signal is achromatic, is of higher density than the predetermined density and matches the predetermined pattern, a signal is outputted which is representative of a character area. As a result, processings such as edge emphasis and smoothing suitable for the area can be performed.

The differentiating circuit is provided with the following discrete circuits: the circuit for emphasizing only the character area; the circuit for emphasizing only the area including the periodic component; and the circuit for emphasizing an area including both the character area and the periodic component. As a result, an emphasizing processing suitable for a material to be copied is performed to produce a clear color copy output.

Obviously, many modifications and variations of the present invention are possible in light of the above teachings. It is therefore to be understood that within the scope of the appended claims, the invention may be practiced other than as specifically described.

TABLE 1

|  | a |
| --- | --- |
| Strong | 1.2 |
| Intermediate | 1 |
| Weak | 0.7 |

TABLE 2

| $S_A$ | $S_{BC}$ | Y1 |
| --- | --- | --- |
| 1 | 1 | B1 |
| 1 | 0 | C1 |
| 0 | 1 | A1 |
| 0 | 0 | C1 |

TABLE 3

|  | High Density Black Character Area | Intermediate Density Black Character Area | Other Areas |
| --- | --- | --- | --- |
| Net-pattern Area | Smoothing + Edge Emphasis (Intermediate) | Smoothing + Edge Emphasis (Weak) | |
| Non-net-pattern Area | Edge Emphasis (Strong) | | Edge Emphasis (Weak) |

What is claimed is:

1. An image processor comprising:

digitizing means for outputting a digital signal produced by digitizing an image;

first detecting means for detecting an area of the digital signal including a periodic component;

second detecting means for detecting a character area of the digital signal;

smoothing means for smoothing the digital signal to output a smoothed signal;

changeover means for outputting either the digital signal or the smoothed signal according to an output of the first detecting means;

differentiating means for substantially differentiating an output of the changeover means by use of a plurality of different coefficients to obtain a plurality of differentiated signals; and selecting means for selecting one of the plurality of differentiated signals according to outputs of the first and second detecting means.

2. An image processor according to claim 1, wherein said first detecting means comprises:

differentiating means for differentiating the digital signal;

counting means for counting a period of an output of the differentiating means; and determining means for determining that an output of the counting means is substantially constant.

3. An image processor according to claim 1, wherein said second detecting means comprises:

density detecting means for detecting that a density of the digital signal is greater than a predetermined density;

color detecting means for detecting that the digital signal has been colored;

pattern detecting means for detecting that the digital signal matches a predetermined pattern; and means for outputting a signal representative of a character area when the digital signal is achromatic, is of higher density than the predetermined density and matches the predetermined pattern.

4. An image processor according to claim 1, wherein said differentiating means comprises:

means for emphasizing only the character area;

means for emphasizing only the area including the periodic component; and means for emphasizing an area including both the character area and the periodic component.

* * * * *